3,374,232
N-ARYL PYRIMIDINIUM COMPOUNDS
George de Stevens, Summit, Herbert Morton Blatter, Millburn, and Richard William James Carney, Murray Hill, N.J., assignors to Ciba Corporation, New York, N.Y., a corporation of Delaware
No Drawing. Filed Mar. 11, 1964, Ser. No. 351,230
12 Claims. (Cl. 260—240.7)

The present invention relates to compounds having a 1-aryl-pyrimidinium ring system, and particularly to compounds of the formula

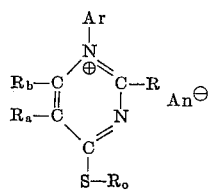

in which Ar is an aryl group, $R_o$ is an organic radical of aliphatic characteristics, R is an organic radical, the group $R_a$ is hydrogen or an organic radical, and the group $R_b$ is an organic radical, and $An^\ominus$ is the anion of an acid or the hydroxyl anion, as well as process for the preparation of such compounds.

In the above compounds, an aryl group representing Ar is a carbocyclic aryl group, particularly monocyclic carbocyclic aryl, i.e., phenyl or substituted phenyl, as well as bicyclic carbocyclic aryl, i.e., naphthyl or substituted naphthyl. Substituted phenyl and substituted naphthyl radicals have one or more than one of the same or different substituents attached to any position available for substitution. Substituents of the aryl group Ar are, for example, lower alkyl, e.g., methyl, ethyl, n-propyl, isopropyl and the like, etherified hydroxyl, such as lower alkoxy, e.g. methoxy, ethoxy, n-propyloxy, isopropyloxy, n-butyloxy and the like, esterified hydroxyl, such as halogeno (representing hydroxyl esterified with a hydrohalic acid), e.g., fluoro, chloro, bromo and the like, etherified mercapto, such as lower alkyl-mercapto, e.g. methyl-mercapto, ethylmercapto and the like, trifluoromethyl, nitro, amino, especially N,N-disubstituted amino, such as N,N-di-lower alkyl-amino, e.g., N,N-dimethylamino, N,N-diethylamino and the like, N,N-alkylene-imino, in which alkylene has from four to six carbon atoms, e.g., 1-pyrrolidino, 1-piperidino and the like, or any other suitable substituent. The aryl group Ar is, therefore, primarily phenyl, (lower alkyl)-phenyl, (lower alkoxy)-phenyl, (halogeno)-phenyl, (lower alkyl-mercapto)-phenyl, (trifluoromethyl)-phenyl, (nitro)-phenyl, (N,N-di-lower alkyl-amino)-phenyl or any other suitably substituted phenyl radical, as well as naphthyl, e.g., 1-naphthyl or 2-naphthyl, or (lower alkyl)-naphthyl, (lower alkoxy)-naphthyl, (halogeno)-naphthyl, (lower alkyl-mercapto)-naphthyl, (trifluoromethyl)-naphthyl, (nitro)-naphthyl, (N,N-di-lower alkyl-amino)-naphthyl and the like.

The group $R_o$, being an organic radical of aliphatic characteristics, is primarily an aliphatic radical, such as a lower aliphatic radical, especially lower alkyl, e.g., methyl, ethyl, n-propyl, isopropyl, n-butyl and the like, as well as lower alkenyl, e.g. allyl and the like. It may also be a cycloaliphatic radical, such as cycloalkyl having from three to eight, especially from five to seven, ring members, e.g. cyclopropyl, cyclopentyl, cyclohexyl, cycloheptyl, cyclo-octyl and the like, a cycloaliphatic-aliphatic radical, such as cycloalkyl-lower alkyl, in which cycloalkyl has from three to eight, especially from five to seven, ring members, e.g., cyclopropylmethyl, cyclopentylmethyl, 2-cyclopentylethyl, cyclohexylmethyl, 1-cyclohexylethyl, cycloheptylmethyl and the like, an araliphatic radical, such as a carbocyclic aryl-lower alkyl radical, for example, phenyl-lower alkyl, e.g. benzyl, 1-phenylethyl, 2-phenylethyl and the like, or any other organic radical with aliphatic characteristics, such as the above radicals having additional substituents, such as lower alkyl, etherified hydroxyl, for example, lower alkoxy and the like, esterified hydroxyl, for example, halogeno and the like, etherified mercapto, for example, lower alkyl-mercapto and the like, trifluoromethyl, nitro, N,N-disubstituted amino, such as N,N-di-lower alkyl-amino, N,N-alkylene-imino and the like, or any other of the previously-mentioned substituents, as well as oxo of the formula =O, thiono of the formula =S and the like.

The organic radical R is, for example, an aryl radical, such as one of the carbocyclic aryl radicals representing Ar, as well as an organic radical of aliphatic characteristics, such as one of the aliphatic radicals representing $R_o$.

Apart from being hydrogen, the group $R_a$ represents an organic radical, such as an aryl group, for example, one of those representing Ar, or an organic radical of aliphatic characteristics, for example, one of those representing $R_o$. More particularly, the group $R_a$ is an organic group having characteristic electron-withdrawing properties, such as a carboxyl group, but especially a functionally converted carboxyl group, an acyl group and the like. A functionally converted carboxyl group is primarily esterified carboxyl, such as carbalkoxy, for example, carbo-lower alkoxy, e.g., carbomethoxy, carbethoxy, carbo-n-propyloxy, carbo-isopropyloxy, carbo-n-butyloxy and the like, or any other esterified carboxyl group, as well as cyano, or carbamyl, such as carbamyl, N-monosubstituted carbamyl, for example, N-lower alkyl-carbamyl, e.g., N-methyl-carbamyl, N-ethyl-carbamyl and the like, or N,N-disubstituted carbamyl, such as N,N-di-lower alkyl-carbamyl, e.g., N,N-dimethyl-carbamyl, N,N-di-ethyl-carbamyl and the like. An acyl group representing $R_a$ is especially an aliphatic substituted carbonyl group, such as lower alkanoyl, e.g., acetyl, propionyl, isobutyryl, pivalyl and the like, as well as an aryl substituted carbonyl group, such as carbocyclic aryl-carbonyl, e.g. benzoyl and the like.

The group $R_b$, representing an organic radical, is more especially an aryl group, for example, one of the carbocyclic aryl groups representing Ar, or an organic radical of aliphatic characteristics, for example, one of those representing $R_o$.

The group $An^\ominus$ is above all the anion of an acid, primarily the anion of an inorganic acid, especially of a hydrohalic acid, e.g., hydrochloric, hydrobromic, hydriodic acid and the like, or of any other inorganic acid, e.g., sulfuric, thiocyanic, perchloric acid and the like, as well as the anion of an organic acid, such as an organic carboxylic acid, e.g., acetic, oxalic, maleic, hydroxymaleic, fumaric, malic, tartaric, citric, benzoic, salicylic acid and the like or more especially of an organic sulfonic acid, e.g. methane sulfonic, ethane sulfonic, 2-hydroxyethane sulfonic, 1,2-ethane disulfonic, benzene sulfonic, p-toluene sulfonic, 2-naphthalene sulfonic acid and the like, or of a monobasic organic sulfuric acid, such as a lower alkyl sulfuric acid, e.g. methyl sulfuric, ethyl sulfuric acid and the like, as well as those of acidic organic nitro componds, e.g., picric, picrolonic, flavianic acid and the like, or those of metal complex acids, e.g. phosphotungstic, phosphomolybdic, chloroplatinic, Reinecke acid and the like. The group $An^\ominus$ may also be the hydroxyl anion of the formula $HO^\ominus$. In the event that the compounds of this invention are used for pharmaceutical purposes, the anion $An^\ominus$ is usually that of a pharmaceutically acceptable acid.

The compounds of this invention have a variety of uses. Thus, they represent versatile intermediates, for example, in the manufacture of cyanine dyes. The latter contain at least two auxochromic nitrogen atoms, one being of tertiary, the other of quaternary characteristics. One of these nitrogen atoms is the ring member of one heterocyclic ring system, the second of another heterocyclic ring system, and both are linked with each other through a chain of conjugated double bonds. In the known cyanine dyes, the quaternary ring nitrogen atom is substituted by a substituent of aliphatic characteristics, such as alkyl, substituted alkyl, aralkyl and the like. The novel compounds of the present invention provide the intermediates for the manufacture of a new class of cyanine dyes, in which at least one of the auxochromic ring-nitrogen atoms is substituted by an aryl group. These dyes are excellent sensitizers of photographic emulsions without causing excessive fog or residual dye stain.

The compounds of this invention also have pharmacological properties, particularly antimicrobial effects, for example, against gram-positive bacteria, e.g., *Diplococcus pneumoniae*, *Staphylococcus aureus* and the like, against gram-negative bacteria, e.g., *Escherichia coli*, *Pseudomonas aeruginosa*, *Salmonella cholerasuis* and the like, against acid-fast bacteria, e.g., *Microbacterium tuberculosis* and the like, against fungi, e.g., *Candida albicans*, *Cryptococcus neoformans*, *Histoplasma capsulatum*, *Trichophyton mentagrophytes* and the like, as well as against protozoa, e.g., *Trichomonas vaginalis* and the like. They are, therefore, useful as antimicrobial agents, either topically or systemically, against bacterial, fungal or protozoal infections. They also show activities against helmints, such as *Nippostrongylus muris* and the like, and are, therefore, useful as anthelmintic agents.

The compounds of this invention are, therefore, also used in the form of compositions for enteral, parenteral or topical administration, which contain a pharmacologically effective amount of the compounds of this invention in admixture with a pharmaceutically acceptable, organic or inorganic, solid or liquid carrier, which usually represents the major portion of the pharmaceutical composition. For making up the latter, there are employed carrier materials suitable for the preparation of pharmaceutical compositions, such as water, gelatine, sugars, e.g., lactose, glucose, sucrose and the like, starches, e.g. corn starch, wheat starch, rice starch and the like stearic acid or salts thereof, e.g., calcium stearate, magnesium stearate and the like, talc, vegetable oils, alcohol, benzyl alcohol, cetyl alcohol, petrolatum, gum accacia, propylene glycol, polyalkylene glycols or any other known carrier for pharmaceutical compositions. The pharmaceutical preparations may be in solid form e.g., capsules, tablets, dragees and the like, in liquid form, e.g. solutions, suspensions and the like, or in the form of emulsions, e.g. salves, creams and the like. If desired, they may contain auxiliary substances, such as preserving, stabilizing, wetting, emulsifying, coloring agents and the like, salts for varying the osmotic pressure, buffers, etc. The above preparations are prepared according to the standard methods used for the manufacture of pharmaceutically acceptable compositions, which, if desired, may also contain, in combination, other physiologically useful substances.

Especially useful are the compounds of the formula

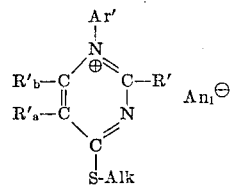

in which Ar′ is monocyclic carbocyclic aryl, especially phenyl, (lower alkyl)-phenyl, (lower alkoxy)-phenyl, (halogeno)-phenyl, (lower alkyl-mercapto)-phenyl, or (nitro)-phenyl, R′ is a lower aliphatic radical, especially lower alkyl, or monocyclic carbocyclic aryl, especially phenyl, (lower alkyl)-phenyl, (lower alkoxy)-phenyl, (halogeno)-phenyl, (lower alkyl-mercapto)-phenyl, or (nitro)-phenyl, Alk is lower alkyl, R′$_{an}$ is a functionally converted carboxyl group, especially carbo-lower alkoxy or cyano, or an acyl group, especially lower alkanoyl or benzoyl, R′$_b$ is lower alkyl or phenyl, and An$_1^\ominus$ is the anion of a hydrohalic acid.

The compounds of this invention are prepared according to known methods, for example, by treating a compound of the formula

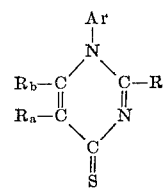

in which Ar, R, R$_a$ and R$_b$ have the previously-given meaning, with a reactive ester of an alcohol of aliphatic characteristics having the formula R$_o$—OH, in which R$_o$ has the previously-given meaning, and, if desired, replacing in the resulting quaternary compound the anion by another anion.

The above reaction is carried out according to known methods. A reactive ester of the alcohol of aliphatic characteristics is an ester of such alcohol with an inorganic acid, particularly a hydrohalic acid, e.g. hydrochloric, hydrobromic, hygdriodic acid and the like, as well as sulfuric acid and the like, or with a suitable organic acid, especially a strong organic sulfonic acid, e.g., methane sulfonic, 2-hydroxyethane sulfonic, p-toluene sulfonic acid and the like. Preferred reactive esters of alcohols having aliphatic characteristics are those of the formula R$_o$-Hal, in which R$_o$ has the previously given meaning, and Hal is halogeno, having preferably an atomic weight greater than 19.

Although the reaction can be carried out by treating the starting material with a reactive ester of the alcohol (either equivalent or excess amounts thereof) in the absence of a diluent, it is preferably performed in the presence of a suitable solvent, e.g. acetone, ethanol and the like, or solvent mixture, if necessary, while cooling or at an elevated temperature, and/or in a closed vessel under increased pressure, and/or in the atmosphere of an inert gas.

As indicated above, the anion in a resulting quaternary compound may be converted into another anion; such conversion is carried out according to known methods. Thus, the anion of an acid may be replaced by the hydroxyl anion, for example, by reacting a resulting quaternary halide with silver oxide, or a quaternary sulfate with barium hydroxide, by treating a quaternary salt with an anion exchange preparation, by electrodialysis or any other suitable method. From a resulting quaternary hydroxide, there may be obtained quaternary salts by reacting the quaternary base with an acid, for example, one of those previously mentioned, or with a mono-lower alkyl sulfate, e.g., methyl sulfate, ethyl sulfate and the like. A resulting quaternary salt may also be converted directly into another quaternary salt without the formation of an intermediate quaternary hydroxide. For example, a quaternary iodide may be reacted with freshly prepared silver chloride or with hydrochloric acid in anhydrous methanol to yield the quaternary chloride; a quaternary salt may also be converted into another quaternary salt by treatment with an anion exchange preparation.

The starting materials used in the above procedure are prepared, for example, by reacting a compound of the formula R$_a$—CH$_2$—C(=O)—R$_b$, in which each of the groups R$_a$ and R$_b$ has the previously given meaning, with an amine of the formula Ar—NH$_2$, in which Ar has the previously-given meaning, if necessary, while removing water, for example, by azeotropic distillation, and reacting the resulting enamine compound of the formula $R_a$—CH=C($R_b$)—NH—Ar, in which Ar, $R_a$ and $R_b$ have the previously-given meaning, with a compound of the formula R—(O=)C—N=C=X, in which R has the previously-given meaning, and X is oxo of the formula =O or thiono of the formula =S, and, if necessary, converting in a resulting compound the oxo group of the pyrimidine portion into the deisred thiono group.

The N-acylated isocyanate and the N-acylated isothiocyanate reagents used in the second step are prepared, for example, by reacting silver nitrate with an alkali metal, e.g. sodium, potassium and the like, isocyanate or isothiocyanate in the presence of a suitable diluent, e.g., diethyl ether and the like, and adding the slurry of the resulting silver isocyanate or silver isothiocyanate to a diethyl ether solution of an acyl halide, particularly of the formula R—CO—Hal, in which Hal is halogeno, e.g., chloro, bromo and the like; the resulting precipitate is filtered off, the filtrate is evaporated, and, if necessary, the desired N-acyl-isocyanate or N-acyl-isothiocyanate compound is purified, for example, by distillation.

The second step in the above procedure is carried out, for example, by mixing the two reagents, advantageously in the presence of a suitable diluent, e.g., tetrahydrofuran, p-dioxane, dimethoxyethane, diethyleneglycol dimethyl ether, diethyl ether, chloroform, toluene and the like, or a mixture of diluents; usually, the reaction mixture is heated to from about 50° C. to about 120° C., if necessary, in a closed vessel, and/or in the atmosphere of an inert gas, e.g., nitrogen.

As indicated above, the oxo group of the pyrimidine portion of a resulting intermediate compound is converted into the thiono group; the conversion is carried out according to known methods, for example, by treatment with phosphorus pentasulfide in the presence of a high-boiling solvent, e.g., xylene and the like.

As previously indicated, the quaternary compounds of this invention are particularly useful as intermediates for the preparation of the compounds of the cyanine dye series. These compounds are primarily those of the following formula

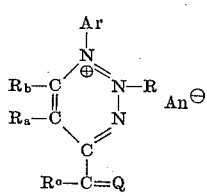

in which Ar, R, $R_a$, $R_b$ and $An^\ominus$ have the previously-given meaning, and in which Q is an N-substituted aza-heterocyclic arylidene radical, in which the ring-nitrogen is part of an enamine grouping, and $R^o$ is hydrogen or an organic radical.

Apart from the required ring-nitrogen atom, the N-substituted aza-heterocyclic arylidene radical may contain other ring-heteroatoms, e.g., sulfur, oxygen or an additional nitrogen atom. The radical Q is monocyclic or polycyclic, especially bicyclic, and is represented, for example, by a 1-substituted 2-pyridylidene, a 1-substituted 4-pyridylidene, a 1-substituted 2-quinolylidene, a 1-substituted 4-quinolylidene, a 2-substituted 1-isoquinolylidene, a 3-substituted 2-thiazolylidene, a 3-substituted 2-benzothiazolylidene, a 3-substituted 2-oxazolylidene, a 3-substituted 2-benzoxazolylidene, a 1,3,3-trisubstituted 2-indolylidene radical or any other similar N-substituted aza-heterocyclic arylidene radical, in which the ring-nitrogen is part of an enamine grouping.

In the above aza-heterocyclic radicals representing Q, the substituent of the ring-nitrogen is an organic radical, such as an organic radical, having aliphatic characteristics, for example, an aliphatic radical, e.g., lower alkyl, as well as lower alkyl substituted by any of the previously-mentioned substituents, or an araliphatic radical, such as a monocyclic carbocyclic aryl-lower alkyl group, e.g., phenyl-lower alkyl and the like, as well as an aryl radical, such as one of those representing Ar, or any other suitable organic radical. Apart from the group substituting the ring-nitrogen, the aza-heterocyclic ring system Q is unsubstituted or may have one or more than one additional substituent, such as lower alkyl, etherified hydroxyl, e.g., lower alkoxy and the like, esterified hydroxyl, e.g., halogeno and the like, etherified mercapto, e.g., lower alkyl-mercapto and the like, trifluoromethyl, nitro, N,N-disubstituted amino, such as N,N-di-lower alkylamino and the like, or any other substituent, such as one of those described before.

The group $R^o$ is above all hydrogen, but may also stand for an organic radical, such as one of the organic radicals of aliphatic characteristics representing $R_o$, or one of the aryl groups representing Ar.

Apart from representing cyanine dyes capable of sensitizing photographic silver emulsions, the above compounds also show valuable pharmacological properties. Above all, they exert pronounced antimicrobial properties, for example, against gram-positive bacteria, gram-negative bacteria, acid-fast bacteria, fungi or protozoa, especially against the previously-mentioned micro-organisms, as well as effects against helmints; they are, therefore, also useful as antimicrobial agents or anthelmintics.

In order to be used as cyanine dyes in the sensitization of photographic silver halide emulsions, the compounds of this invention are dispersed in the emulsions, such as gelatino-silver halide emulsions, e.g. gelatino-silver bromide, gelatino-silver bromo-iodide, gelatino-silver chloride, gelatino-silver chloro-iodide, and the like. The methods of incorporating these dyes in emulsions are conventional and are described in the art.

Particularly useful are the compounds of the following formula

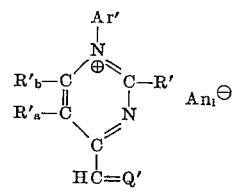

in which Ar′, R′, $R'_a$ $R'_b$ and $An_1^\ominus$ have the previously-given meaning, and Q′ is an at most bicyclic N-lower alkyl-azacyclic arylidene, N-lower alkyl-thiazacyclic arylidene or N-lower alkyl-oxazacyclic arylidene radical, in which the ring-nitrogen is part of an enamine grouping, especially 1-lower alkyl-2-pyridylidene, 1-lower alkyl-4-pyridylidene, 1-lower alkyl-2-quinolylidene, 1-lower alkyl-4-quinolylidene, 2-lower alkyl-1-isoquinolylidene, 3-lower alkyl - 2 - thiazolylidene, 3 - lower alkyl-2-benzothiazolylidene, 3-lower alkyl-2-oxazolylidene, 3-lower alkyl-2-benzoxazolylidene, or 1,3,3-tri-lower alkyl-2-indolylidene, or these radicals having lower alkyl, lower alkoxy, halogeno, lower alkyl-mercapto, nitro or N,N-di-lower alkyl-amino as substituents.

The above compounds are prepared by reacting a quaternary compound of the formula

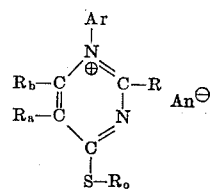

in which Ar, R, $R_o$, $R_a$, $R_b$ and $An^\ominus$ have the previously-given meaning, with a quaternary compound of the formula [$Q_o$—CH$_2$—$R^o$]$^\oplus An_o^\ominus$, in which $R^o$ has the previously-given meaning, $Q_o$ stands for a quaternary N-substituted aza-heterocyclic aryl group capable of furnishing the group Q, and $An_o^\ominus$ stands for the anion of an acid, such as one of the previously-defined anions representing $An^\ominus$, or the hydroxyl anion, and, if desired, converting in the resulting quaternary compound the anion into another anion.

The above reaction is carried out according to known methods. In the quaternary reagent of the formula $[Q_o\text{—}CH_2\text{—}R^o]^\oplus An_o^\ominus$, the group $Q_o$ is more especially a quaternary 2-pyridyl, a quaternary 4-pyridyl, a quaternary 2-quinolyl, a quaternary 4-quinolyl, a quaternary 1-isoquinolyl, a quaternary 2-thiazolyl, a quaternary 2-benzothiazolyl, a quaternary 2-oxazolyl, a quaternary 2-benzoxazolyl, a quaternary 3,3-disubstituted 2-indolenyl group and the like, particularly and at most bicyclic lower alkyl quaternary azacyclic aryl, lower alkyl quaternary thiazacyclic aryl, or lower alkyl quaternary oxazacyclic aryl radical, especially the preferred lower alkyl quaternary 2-pyridyl, lower alkyl quaternary 4-pyridyl, lower alkyl quaternary 2-quinolyl, lower alkyl quaternary 4-quinolyl, lower alkyl quaternary 1-isoquinolyl, lower alkyl quaternary 2-thiazolyl, lower alkyl quaternary 2-benzothiazolyl, lower alkyl quaternary 2-oxazolyl, lower alkyl quaternary 2-benzoxazolyl, or lower alkyl quaternary 3,3-di-lower alkyl-2-indolenyl groups, which may also be substituted as shown above, whereas $R^o$ has the previously-given meaning, but represents primarily hydrogen, and the groups $An_o^\ominus$ is above all a halogen ion.

The reaction is preferably performed in the presence of an acid neutralizing reagent, such as an alkali metal lower alkoxide or an alkaline earth metal lower alkoxide, e.g. sodium, potassium, magnesium or barium methoxide, ethoxide, n-propoxide, isopropoxide or n-butoxide and the like, an alkali metal carbonate or an alkaline earth metal carbonate, e.g. sodium carbonate, potassium carbonate, calcium carbonate and the like, or, more especially, a suitable organic base, such as pyridine, collidine and the like, but particularly an aliphatic amine, such as an N,N,N-tri-lower alkyl-amine, e.g. N,N,N-trimethylamine, N,N-dimethyl-N-ethylamine, N,N,N-triethylamine and the like, as well as an N,N,N',N'-tetra-lower alkyl-alkylenediamine, e.g. N,N,N',N' - tetramethyl-1,6-hexylenediamine and the like, an N-lower alkyl-N,N-alkyleneimine, in which alkylene has from four to six chain members, e.g. N-methyl-pyrrolidine, N-methyl-piperidine, N-ethyl-piperidine and the like, an N-lower alkyl-morpholine, e.g. N-methyl-morpholine and the like, or any other suitable inorganic or organic base, or mixture thereof such as a mixture of pyridine and an aliphatic tertiary amine, e.g. N,N,N-triethylamine and the like.

If necessary, the reaction is performed in the presence of an additional solvent or solvent mixture, at an elevated temperatures and/or, in the atmosphere of an inert gas, e.g. nitrogen.

The optional step of converting the anion in the resulting quaternary compound into another anion is carried out according to the previously described procedure.

The invention also comprises any modification of the process, wherein a compound obtainable as an intermediate at any stage of the process is used as starting material in carrying out the remaining step(s) of the process; also included are any new starting materials and intermediates.

In the process of this invention, those starting materials are preferably used which lead to final products mentioned hereinbefore as being the preferred embodiments of the invention.

The following examples are intended to illustrate the invention and are not to be construed as being limitations thereon. Temperatures are given in degrees centigrade.

EXAMPLE 1

To a solution of 34.0 g. of 5-carbethoxy-1,2-diphenyl-6-methyl-4-thiono-1,4-dihydro-pyrimidine in 200 ml. of acetone is added 50.0 g. of methyl iodide. The reaction mixture is refluxed for two hours and is then chilled; the resulting yellow precipitate is collected and recrystallized from ethanol to yield the 5-carbethoxy-1,2-diphenyl-6-methyl-4-methylmercapto-pyrimidinium iodide of the formula

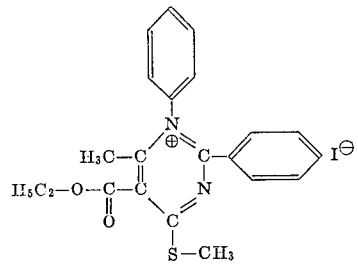

which melts at 198°.

The starting material used in the above procedure is prepared as follows: A mixture of 10.0 g. of ethyl 3-anilino-crotonate and 6.6 g. of N-benzoyl-isothiocyanate in 50 ml. of tetrahydrofuran is refluxed for four hours. The solvent is stripped off and the residue is treated with ethanol. The resulting crystalline 5-carbethoxy-1,2-diphenyl-6-methyl-4-thiono - 1,4 - dihydro-pyrimidine is filtered off and recrystallized from ethanol, M.P. 215°.

EXAMPLE 2

To a solution of 2-(4-bromo-phenyl)-5-carbethoxy-6-methyl-1-phenyl-4-thiono - 1,4 - dihydro-pyrimidine in 50 ml. of ethanol is added 10 g. of methyl iodide. The reaction mixture is refluxed for four hours; the liquids are removed under reduced pressure and the residue is triturated with acetone and diethyl ether. The orange precipitate is filtered off to yield the 2-(4-bromo-phenyl)-5-carbethoxy-6-methyl - 4 - methylmercapto-1-phenyl-pyrimidinium iodide of the formula

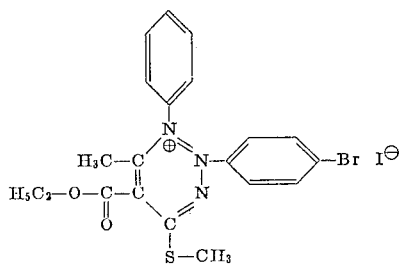

melting at 210°.

The starting material used in the above procedure is prepared as follows: A mixture of 10.0 g. of ethyl 3-aniline-crotonate and 11.0 g. of N-(4-bromo-benzoyl)-isothiocyanate in 100 ml. of tetrahydrofuran is refluxed for four hours. The solvent is evaporated, the residue is treated with a small amount of ethanol, and the crystalline 2-(4-bromo-phenyl) - 5 - carbethoxy-6-methyl-1-phenyl-4-thiono-1,4-dihydro-pyrimidine is filtered off and recrystallized three times from ethanol, M.P. 200°; yield: 11.5 g.

EXAMPLE 3

The 5-carbethoxy-4-ethylmercapto-6-methyl-2-(3-nitrophenyl)-1-phenyl-pyrimidinium iodide of the formula

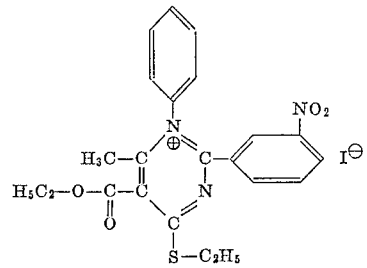

is obtained by reacting 5.0 g. of 5-carbethoxy-6-methyl-2-(3-nitro-phenyl)-1-phenyl-1,4-dihydro - pyrimidine with an excess of ethyl iodide in acetone according to the procedure described in Examples 1 and 2.

The starting material used in the above procedure is prepared as follows: A mixture of 5.0 g. of ethyl 3-anilinocrotonate and 5.0 g. of N-(3-nitrobenzoyl)-isothiocyanate in 50 ml. of tetrahydrofuran is refluxed for four hours. The solvent is evaporated, the residue is taken up in a small amount of ethanol, and the crystalline 5-carbethoxy - 6 - methyl - 2 - (3 - nitro-phenyl) - 1 - phenyl-4-thiono-1,4-dihydro-pyrimidine is filtered off and recrystallized from ethanol, M.P. 240°; yield: 2.5 g.

EXAMPLE 4

A mixture of 1.0 g. of 5-carbethoxy-2,6-dimethyl-1-phenyl-4-thiono-1,4-dihydro-pyrimidine and an excess of methyl iodide in 20 ml. of acetone is refluxed for two hours. The acetone is removed under reduced pressure, and the residue is chilled to yield the 5-carbethoxy-2,6-dimethyl - 4 - methylmercapto-1-phenyl-pyrimidinium iodide of the formula

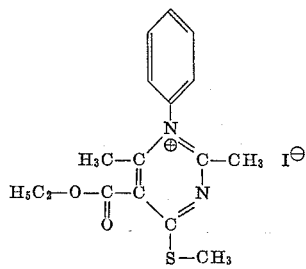

which melts at 154–155°.

The starting material used in the above procedure is prepared as follows: To a solution of 10.0 g. of ethyl 3-anilinocrotonate in 20 ml. of diethyl ether is added 11.3 g. of N-acetylisothiocyanate while stirring. A yellow precipitate is formed after about ten minutes, which is filtered off and recrystallized from an excess of ethanol to yield the 5 - carbethoxy-2,6-dimethyl-1-phenyl-4-thiono-1,4-dihydro-pyrimidine, M.P. 207–209°.

EXAMPLE 5

Other compounds of this invention, prepared according to the previously described and illustrated procedure, are, for example, diphenyl - 6 - methyl - 4 - (1 - ethyl - 2 - quinolylidene-methyl)-pyrimidinium iodide of the formula

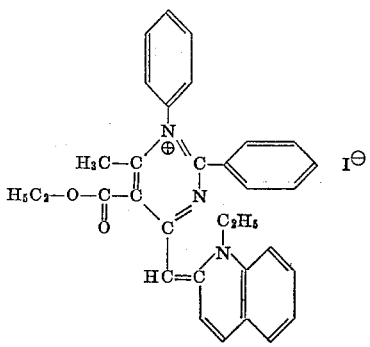

melts at 120° after recrystallization from ethanol.

EXAMPLE 7

A mixture of 2.9 g. of 2-methyl-benzothiazole methiodide and 4.92 g. of 5-carbethoxy-1,2-diphenyl-6-methyl-4-methylmercapto-pyrimidinium iodide in 50 ml. of ethanol is refluxed for four hours in the presence of 2 ml. of N,N,N-triethylamine. After chilling, the desired 4 - (3 - methyl - 2 - benzothiazolylidene-methyl) - 5 - carbethoxy-1,2-diphenyl-6-methyl-pyrimidinium iodide of the formula

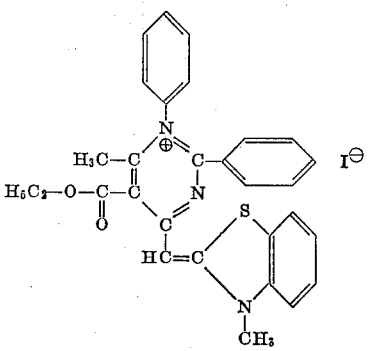

precipitates and is filtered off; it melts at 260–262° after recrystallization from ethanol.

| Starting Material | Quaternizing Reagent | Quaternary Product |
|---|---|---|
| 5-carbomethoxy-6-methyl-2-(2-methyl-phenyl)-1-phenyl-4-thiono-1,4-dihydro-pyrimidine. | Methyl iodide | 5-carbomethoxy-6-methyl-4-methylmercapto-2-(2-methyl-phenyl)-1-phenyl-pyrimidinium iodide. |
| 5-carbo-n-propyloxy-2,6-dimethyl-1-(4-fluoro-phenyl)-4-thiono-1,4-dihydro-pyrimidine. | Dimethyl sulfate | 5-carbo-n-propyloxy-2,6-dimethyl-1-(4-fluoro-phenyl)-4-methylmercapto-pyrimidinium methosulfate. |
| 5-acetyl-4-thiono-1,2,6-triphenyl-1,4-dihydro-pyrimidine. | Methyl iodide | 5-acetyl-4-methylmercapto-1,2,6-triphenyl-pyrimidinium iodide. |
| 5,6-dimethyl-2-(4-methoxy-phenyl)-1-phenyl-4-thiono-1,4-dihydro-pyrimidine. | Ethyl iodide | 5,6-dimethyl-4-ethylmercapto-2-(4-methoxy-phenyl)-1-phenyl-pyrimidinium iodide. |
| 2-benzyl-5-cyano-6-methyl-1-phenyl-4-thiono-1,4-dihydro-pyrimidine. | Methyl iodide | 2-benzyl-5-cyano-6-methyl-4-methylmercapto-1-phenyl-pyrimidinium iodide. |
| 5-carbethoxy-6-methyl-1-phenyl-4-thiono-2-(4-trifluoromethyl-phenyl)-1,4-dihydro-pyrimidine. | Benzyl bromide | 4-benzylmercapto-5-carbethoxy-6-methyl-1-phenyl-2-(4-trifluoromethyl-phenyl)-pyrimidinium bromide. |
| 5-carbethoxy-2-ethyl-6-methyl-1-(2-naphthyl)-4-thiono-1,4-dihydro-pyrimidine. | Methyl iodide | 5-carbethoxy-2-ethyl-6-methyl-4-methylmercapto-1-(2-naphthyl)-pyrimidinium iodide. |
| 5-carbamyl-1,2-diphenyl-6-ethyl-4-thiono-1,4-dihydro-pyrimidine. | Allyl bromide | 4-allylmercapto-5-carbamyl-1,2-diphenyl-6-ethyl-pyrimidinium bromide. |

EXAMPLE 6

A mixture of 2.99 g. of 2-quinaldine ethiodide and 4.92 g. of 5 - carbethoxy - 1,2 - diphenyl - 6 - methyl - 4 - methylmercapto-pyrimidinium iodide in 50 ml. of ethanol is refluxed for four hours in the presence of 2 ml. of N,N,N-triethylamine. The reaction mixture is chilled and the precipitate is collected; the resulting 5-carbethoxy-1,2-

EXAMPLE 8

A mixture of 1.5 g. of 2-quinaldine ethiodide and 2.82 g. of 2 - (4 - bromo-phenyl)-5-carbethoxy-6-methyl-4-methylmercapto-1-phenyl-pyrimidinium iodide in 25 ml. of ethanol is refluxed for three hours in the presence of 1 ml. of N,N,N-triethylamine. After chilling, the desired 2 - (4 - bromo-phenyl) - 5 - carbethoxy - 4 - (1 - ethyl- 2 - quinolylidene - methyl) - 6 - methyl-1-phenyl-pyrimidinium iodide of the formula

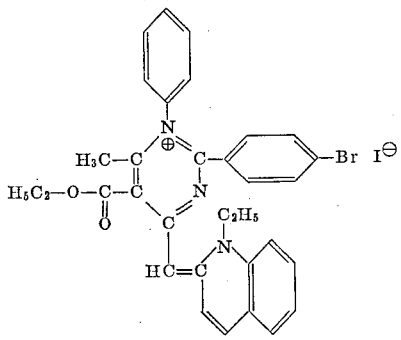

precipitates and is recrystallized from ethanol, m.p. 160°.

EXAMPLE 9

A mixture of 1.4 g. of 6-N,N-diethylamino-2-quinaldine methiodide and 2.0 g. of 5-carbethoxy-1,2-diphenyl-6-methyl-4-methylmercapto-pyrimidinium iodide in 50 ml. of ethanol containing 1 ml. of N,N,N-triethylamine is refluxed for two hours and is then cooled. After trituration with diethyl ether, the desired 5-carbethoxy-4-(6 - N,N - diethylamino - 1 - methyl - 2 - quinolylidene-methyl) - 1,2 - diphenyl-6-methyl-pyrimidinium iodide of the formula

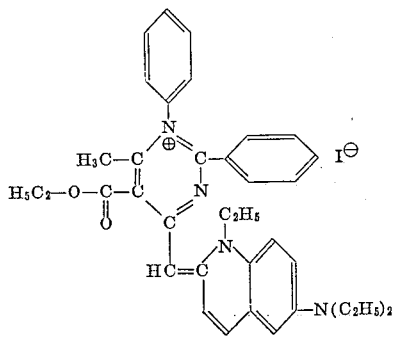

precipitates, is filtered off and recrystallized twice from acetone, M.P. 100°.

EXAMPLE 10

A mixture of 1.4 g. of 5-carbethoxy-2,6-dimethyl-4-methylmercapto-1-phenyl-pyrimidinium iodide and 0.9 g. of 2-methyl-benzothiazole methiodide in 15 ml. of ethanol containing 1 ml. of N,N,N-triethylamine is refluxed for six hours. After chilling, the desired 5-carbethoxy - 2,6 - dimethyl - 4-(1-methyl-2-benzothiazolylidene-methyl)-1-phenyl-pyrimidinium iodide of the formula

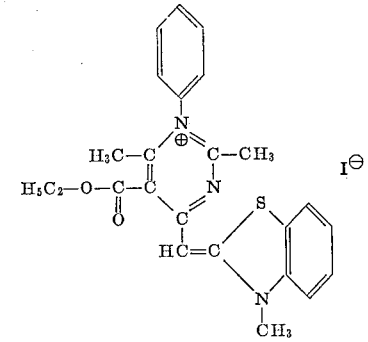

precipitates, is collected and recrystallized from ethanol, M.P. 247°.

EXAMPLE 11

The following compounds of this invention are prepared according to the previously described and illustrated procedure by selecting the appropriate starting materials:

| Reagent I | Reagent II | Product |
| --- | --- | --- |
| 5-carbethoxy-1,2-diphenyl-6-methyl-4-methylmercapto-pyrimidinium iodide. | 2-picoline methiodide | 5-carbethoxy-1,2-diphenyl-6-methyl-4-(1-methyl-2-pyridylidene-methyl)-pyrimidinium iodide. |
| 5-carbomethoxy-6-methyl-4-methylmercapto-2-(2-methyl-phenyl)-1-phenyl-pyrimidinium iodide. | 4-picoline methiodide | 5-carbomethoxy-6-methyl-2-(2-methyl-phenyl)-1-phenyl-4-(1-methyl-4-pyridylidene-methyl)-pyrimidinium iodide. |
| 5-carbo-n-propyloxy-2,6-dimethyl-1-(4-fluorophenyl)-4-methylmercapto-pyrimidinium iodide. | 1-benzyl-2-quinaldinium iodide. | 4-(1-benzyl-2-quinolydidene-methyl)-5-carbo-n-propyloxy-2,6-dimethyl-1-(4-fluorophenyl)-pyrimidinium iodide. |
| 5-acetyl-4-methylmercapto-1,2,6-triphenyl pyrimidinium iodide. | 4-quinaldine ethiodide | 5-acetyl-4-(1-alkyl-4-quinolylidene-methyl)-1,2,6-triphenyl-pyrimidinium iodide. |
| 5,6-dimethyl-4-ethylmercapto-2-(4-methoxyphenyl)-1-phenyl-pyrimidinium iodide. | 1-methyl-isoquinoline methiodide. | 5,6-dimethyl-2-(4-methoxy-phenyl)-4-(2-methyl-1-isoquinolylidene-methyl)-1-phenyl-pyrimidinium iodide. |
| 2-benzyl-5-cyano-6-methyl-4-methylmercapto-1-phenyl-pyrimidinium iodide. | 2-methylthiazole methiodide. | 2-benzyl-5-cyano-6-methyl-4-(3-methyl-2-thiazolylidene-methyl)-1-phenyl-pyrimidinium iodide. |
| 4-benzylmercapto-5-carbethoxy-6-methyl-1-phenyl-2-(4-trifluoromethyl-phenyl)-pyrimidinium iodide. | 2-methyloxazol methiodide | 5-carbethoxy-6-methyl-4-(3-methyl-2-oxazolylidene-methyl)-1-phenyl-2-(4-trifluoromethylphenyl)-pyrimidinium iodide. |
| 5-carbethoxy-2-ethyl-6-methyl-4-methylmercapto-1-(2-naphthyl)-pyrimidinium iodide. | 2-methylbenzoxazole methiodide. | 5-carbethoxy-2-ethyl-6-methyl-4-(3-methyl-2-benzoxazolylidene-methyl)-1-(2-naphthyl)-pyrimidinium iodide. |
| 4-allylmercapto-5-carbamyl-1,2-diphenyl-6-ethyl-pyrimidinium iodide. | 3,3-dimethyl-indolenine methiodide. | 5-carbamyl-1,2-diphenyl-6-ethyl-4-(1,3,3-trimethyl-2-indolylidene-methyl)-pyrimidinium iodide. |
| 5-carbethoxy-4-ethylmercapto-6-methyl-2-(3-nitro-phenyl)-1-phenyl-pyrimidinium iodide. | 6-methoxy-2-quinaldinium ethiodide. | 5-carbethoxy-4-(1-ethyl-6-methoxy-2-quinolylidene-methyl)-6-methyl-2-(3-nitro-phenyl)-1-phenyl-pyrimidinium iodide. |

What is claimed is:
1. A compound of the formula

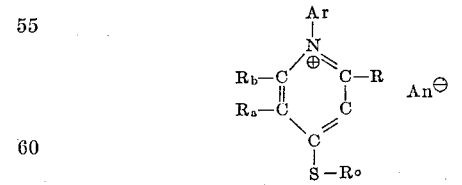

in which Ar stands for a member selected from the group consisting of phenyl, (lower alkyl)-phenyl, (lower alkoxy)-phenyl, (halogeno)-phenyl, (lower alkylmercapto)-phenyl, (trifluoromethyl)-phenyl, (nitro)-phenyl and (di-lower alkylamino)-phenyl, each of R and $R_b$ for a member selected from the group consisting of lower alkyl, lower alkenyl, cycloalkyl and cycloalkyl-lower alkyl having from three to eight ring members, phenyl-lower alkyl, phenyl, (lower alkyl)-phenyl, (lower alkoxy)-phenyl, (halogeno)-phenyl, (lower alkylmercapto)-phenyl, (trifluoromethyl)-phenyl, (nitro)-phenyl and (di-lower alkylamino)-phenyl, $R_o$ for a member selected from the group consisting of lower alkyl, lower alkenyl, cycloalkyl and cycloalkyl-lower alkyl having from three to eight ring members, and phenyl-lower alkyl, $R_a$ for a member selected from the group consisting of carboxy, carbo-lower alkoxy, cyano, carbamyl, lower alkylcarbamyl, di-lower alkylcarbamyl, lower alkanoyl and benzoyl and $An^\ominus$ for a member selected from the group consisting of the hydroxyl ion and the anion of a pharmaceutically acceptable acid.

2. A compound of the formula

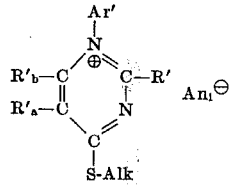

in which Ar' is a member selected from the group consisting of phenyl, (lower alkyl)-phenyl, (lower alkoxy)-phenyl, (halogeno)-phenyl, (lower alkylmercapto)-phenyl and (nitro)-phenyl, R' is a member selected from the group consisting of lower alkyl, phenyl, (lower alkyl)-phenyl, (lower alkoxy) - phenyl, (halogeno) - phenyl, (lower alkylmercapto)-phenyl and (nitro)-phenyl, Alk is lower alkyl, $R'_a$ is a member selected from the group consisting of carbo-lower alkoxy, cyano, lower alkanoyl and benzoyl and $R'_b$ is a member selected from the group consisting of lower alkyl and phenyl, and $An_1^\ominus$ is the anion of a hydrohalic acid.

3. 5-carbethoxy-1,2-diphenyl-6-methyl-4-methylmercapto-pyrimidinium iodide.
4. 2-(4-bromo-phenyl)-5-carbethoxy-6-methyl-4-methylmercapto-1-phenyl-pyrimidinium iodide.
5. 5-carbethoxy-2,6-dimethyl-4-methylmercapto-1-phenyl-pyrimidinium iodide.
6. A compound of the formula

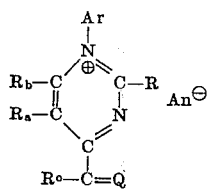

in which Ar stands for a member selected from the group consisting of phenyl, (lower alkyl)-phenyl, (lower alkoxy)-phenyl, (halogeno)-phenyl, (lower alkylmercapto)-phenyl, (trifluoromethyl)-phenyl, (nitro)-phenyl and (di-lower alkylamino)-phenyl, each of R and $R_b$ for a member selected from the group consisting of lower alkyl, lower alkenyl, cycloalkyl and cycloalkyl-lower alkyl having from three to eight ring members, phenyl-lower alkyl, phenyl, (lower alkyl)-phenyl, (lower alkoxy)-phenyl, (halogeno)-phenyl, (lower alkylmercapto)-phenyl, (trifluoromethyl)-phenyl, (nitro)-phenyl and (di-lower alkylamino)-phenyl, $R_o$ for a member selected from the group consisting of lower alkyl, lower alkenyl, cycloalkyl and cycloalkyl-lower alkyl having from three to eight ring members, and phenyl-lower alkyl, Q for a member selected from the group consisting of 1-$R_1$-2-pyridylidene, 1-$R_1$-4-pyridylidene, 1-$R_1$-2-quinolylidene, 1-$R_1$-4-quinolylidene, 2-$R_1$ - 1 - isoquinolylidene, 3-$R_1$-2-thiazolylidene, 3-$R_1$-2-benzothiazolylidene, 3-$R_1$-oxazolylidene, 3-$R_1$-2-benzoxazolylidene, 1,3,3-tri-$R_1$-2-indolylidene, in which $R_1$ stands for lower alkyl, and those radicals having a member selected from the group consisting of lower alkyl, lower alkoxy, halogeno, lower alkylmercapto, trifluoromethyl, nitro and di-lower alkylamino as substituent, $R_a$ for a member selected from the group consisting of carboxy, carbo-lower alkoxy, cyano, carbamyl, lower alkylcarbamyl, di-lower alkylcarbamyl, lower alkanoyl and benzoyl and $An^\ominus$ for a member selected from the group consisting of the hydroxyl ion and the anion of a pharmaceutically acceptable acid.

7. A compound of the formula

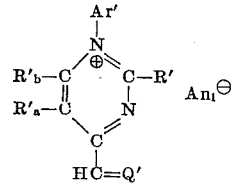

in which Ar' is a member selected from the group consisting of phenyl, (lower alkyl)-phenyl, (lower alkoxy)-phenyl, (halogeno)-phenyl, (lower alkylmercapto)-phenyl and (nitro)-phenyl, R' is a member selected from the group consisting of the lower alkyl, phenyl, (lower alkyl)-phenyl, (lower alkoxy) - phenyl, (halogeno) - phenyl, (lower alkylmercapto)-phenyl and (nitro)-phenyl, Q' is a member selected from the group consisting of 1-$R_1$-2-pyridylidene, 1-$R_1$-4-pyridylidene, 1-$R_1$-2-quinolylidene, 1-$R_1$-4-quinolylidene, 2-$R_1$ - 1 - isoquinolylidene, 3-$R_1$-2-thiazolylidene, 3-$R_1$-2-benzothiazolylidene, 3-$R_1$-2-oxazolylidene, 3-$R_1$-2-benzoxazolylidene, 1,3,3-tri-$R_1$-2-indolylidene, in which $R_1$ stands for lower alkyl, and those radicals having a member selected from the group consisting of lower alkyl, lower alkoxy, halogeno, lower alkylmercapto, trifluoromethyl, nitro and di-lower alkylamino as substituent, $R'_a$ is a member selected from the group consisting of carbo-lower alkoxy, cyano, lower alkanoyl and benzoyl, $R'_b$ is a member selected from the group consisting of lower alkyl and phenyl, and $An_1^\ominus$ is the anion of a hydrohalic acid.

8. 5-carbethoxy-1,2-diphenyl-6-methyl-4-(1-ethyl-2-quinolylidene-methyl)-pyrimidinium iodide.
9. 4-(3-methyl-2-benzothiazolylidene-methyl)-5-carbethoxy-1,2-diphenyl-6-methyl-pyrimidinium iodide.
10. 2-(4-bromo-phenyl)-5-carbethoxy-4-(1-ethyl-2-quinolylidene-methyl)-6-methyl-1-phenyl-pyrimidinium iodide.
11. 5-carbethoxy-4-(6-N,N-diethylamino-1-methyl-2-quinolylidene-methyl)-1,2-diphenyl-6-methyl-pyrimidinium iodide.
12. 5-carbethoxy-2,6-dimethyl-4-(1-methyl-2-benzothiazolylidene-methyl)-1-phenyl-pyrimidinium iodide.

References Cited
UNITED STATES PATENTS
2,984,664   5/1961   Fry et al. _____ 260—240.7 X
3,000,738   9/1961   Von Rintelen ____ 260—240.7 X
3,102,141   8/1963   Clark et al. _____ 260—240.7 X

FOREIGN PATENTS
425,609   3/1935   Great Britain.

OTHER REFERENCES
Venkataraman, The Chemistry of Synthetic Dyes, vol. II, p. 1185, Academic Press Inc. (1952).

Chemical Abstracts, vol. 52, col. 16469 (1958) (abstract of Banno).

JOHN D. RANDOLPH, *Primary Examiner.*

NICHOLAS RIZZO, *Examiner.*